United States Patent [19]
Woo

[11] Patent Number: 5,498,430
[45] Date of Patent: Mar. 12, 1996

[54] METHOD OF CONTROLLING SEASONING OF KIMCHI IN REFRIGERATOR

[75] Inventor: Ki C. Woo, Kyungsangman-Do, Rep. of Korea

[73] Assignee: Goldstar Co., Ltd., Seoul, Rep. of Korea

[21] Appl. No.: 360,598

[22] Filed: Dec. 21, 1994

Related U.S. Application Data

[62] Division of Ser. No. 102,812, Aug. 6, 1993, Pat. No. 5,398,599.

[30] Foreign Application Priority Data

Aug. 19, 1992 [KR] Rep. of Korea ............... 14918/1992
Dec. 4, 1992 [KR] Rep. of Korea ............... 23292/1992

[51] Int. Cl.⁶ ............................................. A23L 3/00
[52] U.S. Cl. ..................... 426/231; 426/49; 426/615
[58] Field of Search ........................... 426/231, 615, 426/270, 49, 650; 99/468, 470, 476, 480, 483

[56] References Cited

U.S. PATENT DOCUMENTS

| | | | |
|---|---|---|---|
| 2,671,643 | 3/1954 | Gordon, Jr. | 165/30 |
| 3,377,941 | 4/1968 | Jaremus | 99/468 |
| 3,682,643 | 8/1972 | Foster | 165/30 |
| 4,202,912 | 5/1980 | Kim | 426/615 |
| 5,142,969 | 9/1992 | Chun | 99/468 |
| 5,228,499 | 7/1993 | Yoon | 165/30 |
| 5,336,516 | 8/1994 | Yamamoto et al. | 426/615 |

FOREIGN PATENT DOCUMENTS

| | | | |
|---|---|---|---|
| 4-28990 | 1/1992 | Japan | 62/187 |
| 923868 | 3/1992 | Rep. of Korea . | |

*Primary Examiner*—George Yeung

[57] ABSTRACT

A method of and an apparatus for controlling seasoning of kimchi, capable of meeting maximally the user's taste, by deriving a seasoning condition by deduction about the load of kimchi to be seasoned, seasoning the kimchi according to the derived seasoning condition, and varying a seasoning time derived based on the user's taste in a small range, are disclosed. The method includes the steps of closing a damper and driving a heater for a predetermined time when a kimchi seasoning mode is selected, deducing the load of kimchi to be seasoned from a difference between a peripheral temperature of the heater and an internal temperature of the kimchi seasoning chamber after the driving of the heater for the predetermined time, deriving a normal seasoning condition for the kimchi based on the deduced kimchi load, seasoning the kimchi according to the derived normal seasoning condition, and maintaining the seasoned kimchi at a predetermined storing temperature after seasoning the kimchi for carrying out a kimchi storing mode.

15 Claims, 10 Drawing Sheets

| AMBIENT TEMP. / KIMCHI TEMP. / SEASONING TIME | | WINTER | | SPRING-AUTUMN | | SUMMER | |
|---|---|---|---|---|---|---|---|
| AMBIENT TEMP. | | 13°C ← | 13~17°C | 17~21°C | 21~25°C | 25~29°C | 29°C ← |
| KIMCHI TEMP. | | 10°C ← | 10~14°C | 14~18°C | 18~22°C | 22~26°C | 26°C |
| PRIMARY SEASONING | | 8 HOURS | 6 HOURS | 4 HOURS | 2 HOURS | 0 | 0 |
| SECONDARY SEASONING | HIGH | 15 HOURS (CONTROL KIMCHI CHAMBER RA SENSOR AT 25°C) | | | | | CONTROL AT 29°C |
| | NORMAL | 15 HOURS (CONTROL KIMCHI CHAMBER RA SENSOR AT 23°C) | | | | | |
| | LOW | 15 HOURS (CONTROL KIMCHI CHAMBER RA SENSOR AT 20°C) | | | | | |
| THIRD SEASONING | | 5 HOURS | | | | | |

5,498,430

METHOD OF CONTROLLING SEASONING OF KIMCHI IN REFRIGERATOR

BACKGROUND OF THE INVENTION

This application is a divisional of copending application Ser. No. 08/102,812, filed on Aug. 6, 1993, now U.S. Pat. No. 5,398,599.

1. Field of the Invention

The present invention relates to a refrigerator, and more particularly to a method of and an apparatus for controlling seasoning of kimchi in a refrigerator.

2. Description of the Background Art

Generally, seasoning of kimchi is achieved by utilizing a fermentation of a microorganism. For a spontaneous seasoning of kimchi, a long seasoning time is required. The seasoning time may be substantially reduced by forming artificially the optimum condition for the microorganism taking part in the seasoning of kimchi.

The seasoning of kimchi is generally carried out under a certain seasoning condition such as a certain seasoning temperature and a certain seasoning time. After the seasoning, kimchi is stored under a low temperature condition, so as to suppress the fermentation of microorganism.

Conventionally, there have been proposed various methods of seasoning and storing kimchi, in Korean Patent Application Nos. 6278/88 and 12619/90 (Korean Patent Publication No. 92-3868).

In the case of the patent application 6278/88, carbon dioxide ($CO_2$) generated when kimchi is fermented is collected and used to generate a gas. The number of bubbles of the generated gas is counted. In accordance with this method, the seasoning of kimchi is continued until the number of bubbles reaches a predetermined maximum number.

However, this method requires a use of a device for measuring the amount of generated gas, which is very complex in construction. Due to the complex construction, there is a difficulty in installing the measuring device in the refrigerator. Since the gas for checking the seasoned degree of kimchi is exhausted, the kimchi becomes dried and discolored at the surface thereof, so that it is deteriorated. In accordance with this method, a point of time when the maximum amount of carbon dioxide is detected is regarded as the optimum seasoning point. At this point, the seasoned kimchi is stored without reservation. As a result, there is a disadvantage of an impossibility to meet the taste of persons having a weakness for immaturely seasoned kimchi.

The patent application 12819/90 discloses a kimchi seasoning method comprising selecting one from two kinds of fermentation speeds including a normal one and an intensive one and one from several predetermined seasoning levels and seasoning kimchi at a seasoning temperature corresponding to the selected fermentation speed and for a seasoning time corresponding to the selected seasoning level.

In accordance with this method, the seasoning time is directly selected by the user.

However, the method encounters a problem that the seasoned degree of kimchi is varied, depending on the quantity of kimchi to be seasoned, because the method does not take the quantity of kimchi into consideration.

Depending on the ambient temperature when kimchi is prepared, the kimchi may be more or less seasoned before it is put in a kimchi seasoning chamber. Such a seasoning may be called a spontaneous seasoning. Such a spontaneous seasoning is not the seasoning accomplished by virtue of heat generated from a heater in the kimchi seasoning chamber, but the seasoning already accomplished by virtue of the ambient temperature before the kimchi is put in the kimchi storing chamber.

For instance, where kimchi is prepared in summer, it may be assumed that seasoning of about 10% is accomplished by the ambient temperature before the putting kimchi in the kimchi storing chamber. Where kimchi is prepared during winter, it may be assumed that no seasoning is accomplished before putting the kimchi in the kimchi storing chamber.

If seasoning of 100% is accomplished during winter, seasoning of 110% may be accomplished during summer at the same seasoning condition. In order to achieve the same seasoned degree of kimchi irrespective of the season, therefore, it is required to provide a certain seasoned degree of, for example, 30% at the initial stage of the seasoning and carry out the remaining part of the seasoning, depending on the user's selection.

SUMMARY OF THE INVENTION

Therefore, an object of the invention is to provide a method of controlling a seasoning of kimchi, capable of meeting maximally the user's taste, by deriving a seasoning condition by deduction about the load of kimchi to be seasoned, seasoning the kimchi according to the derived seasoning condition, and varying a seasoning time derived based on the user's taste, in a small range.

Another object of the invention is to provide a method of controlling a seasoning of kimchi, capable of seasoning kimchi to meet the user's taste, irrespective of the season during which the kimchi is prepared.

In accordance with an aspect, the present invention provides a method of controlling a seasoning of kimchi in a refrigerator equipped with a kimchi seasoning chamber having a damper for allowing cold air to enter the kimchi seasoning chamber at its opened state and a heater for heating the kimchi seasoning chamber, the method including the steps of (a) closing the damper and driving the heater for a predetermined time when a kimchi seasoning mode is selected; (b) deducing the load of kimchi to be seasoned, from a difference between a peripheral temperature of the heater and an internal temperature of the kimchi seasoning chamber after the driving of the heater for the predetermined time; (c) deriving a normal seasoning condition for the kimchi, based on the deduced kimchi load; (d) seasoning the kimchi according to the derived normal seasoning condition; and (e) maintaining the seasoned kimchi at a predetermined storing temperature after the seasoning of the kimchi at the step (d), for carrying out a kimchi storing mode.

In accordance with another aspect, the present invention provides a method of controlling a seasoning of kimchi in a refrigerator equipped with a kimchi seasoning chamber, the method including the steps of: (a) deducing a spontaneously seasoned degree of kimchi to be seasoned when a kimchi seasoning mode is selected, the degree being indicative of the degree that the kimchi has already been seasoned before it is poured in the kimchi seasoning chamber; (b) deriving an initial seasoning condition, based on the deduced spontaneously seasoned degree and seasoning the kimchi contained in the kimchi seasoning chamber to a predetermined degree, according to the derived initial seasoning condition; (c) deriving a main seasoning condition according to the user's taste selected and carrying out a main seasoning of the kimchi according to the derived main seasoning condition; and (d) maintaining the seasoned kimchi at a predetermined storing temperature after completing the main seasoning, for carrying out a storing mode for the kimchi.

The load of kimchi is determined by sensing the difference between the internal temperature of the kimchi seasoning chamber and the temperature of the kimchi seasoning heater. Based on the deduced kimchi load, seasoning of kimchi is carried out for a kimchi seasoning time corresponding to a selected notch condition. The spontaneously seasoned degree of kimchi is deduced by calculating an initial pouring temperature from an ambient temperature sensed. Based on the deduced spontaneously seasoned degree of kimchi, an initial seasoning condition is determined. As the kimchi is primarily seasoned under the determined initial seasoning condition, the seasoned degree of kimchi becomes constant irrespective of the season.

As the initially seasoned degree of kimchi becomes constant irrespective of the season by virtue of the initial seasoning, the deviation in seasoning due to a season change can be minimized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and aspects of the invention will become apparent from the following description of embodiments with reference to the accompanying drawings, which are given by way of illustration only and thus are not limitative of the present invention, and in which.

DETAILED DESCRIPTION OF THE PREFERRED EMBODIMENTS

Figure 1:
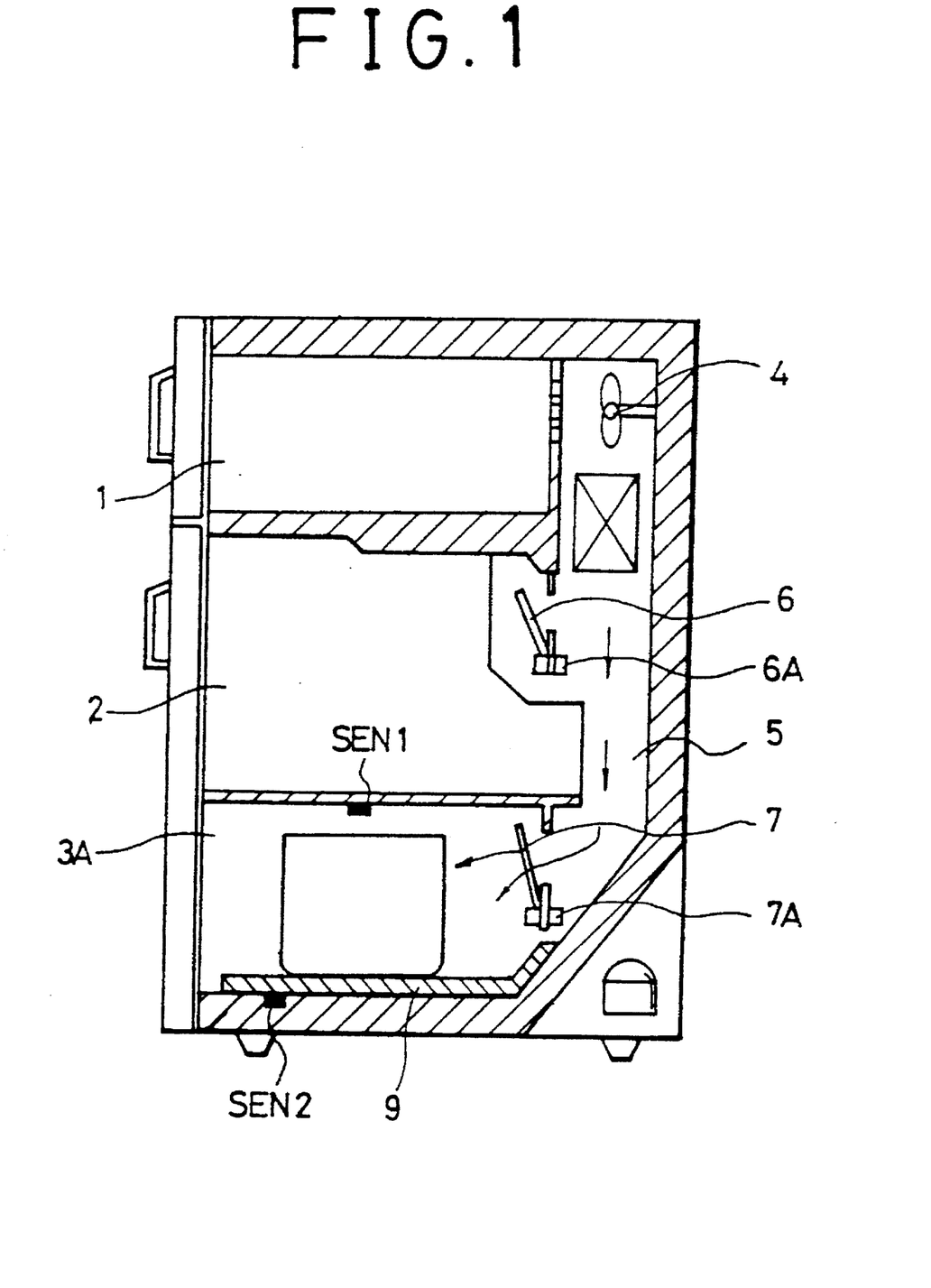
FIG. 1 is a schematic sectional view of a refrigerator in accordance with a first embodiment of the present invention.

FIG. 1 is a schematic sectional view of a refrigerator in accordance with a first embodiment of the present invention. As shown in FIG. 1, the refrigerator comprises a refrigerator body including an upper freezing chamber 1, an intermediate refrigerating chamber 2 and a lower kimchi seasoning chamber 3A. At the rear portion of the body, a duet 8 is provided, which is adapted to guide a cold air supplied from a cooling fan 4 disposed at the freezing chamber 1, to the kimchi seasoning chamber 3A.

At rear portions of the refrigerating chamber 2 and kimchi seasoning chamber 3A, a pair of dampers 6 and 7 are disposed, which are controlled to be opened and closed by a pair of damper motors 6A and 7A, respectively. A heater 9 is disposed at the bottom portion of kimchi seasoning chamber 3A. Disposed at the top and bottom portions of kimchi seasoning chamber 3A are a sensor SEN1 for sensing the temperature of the kimchi seasoning chamber 3A and a sensor SEN2 for sensing the temperature of the heater 9.

Figure 2:
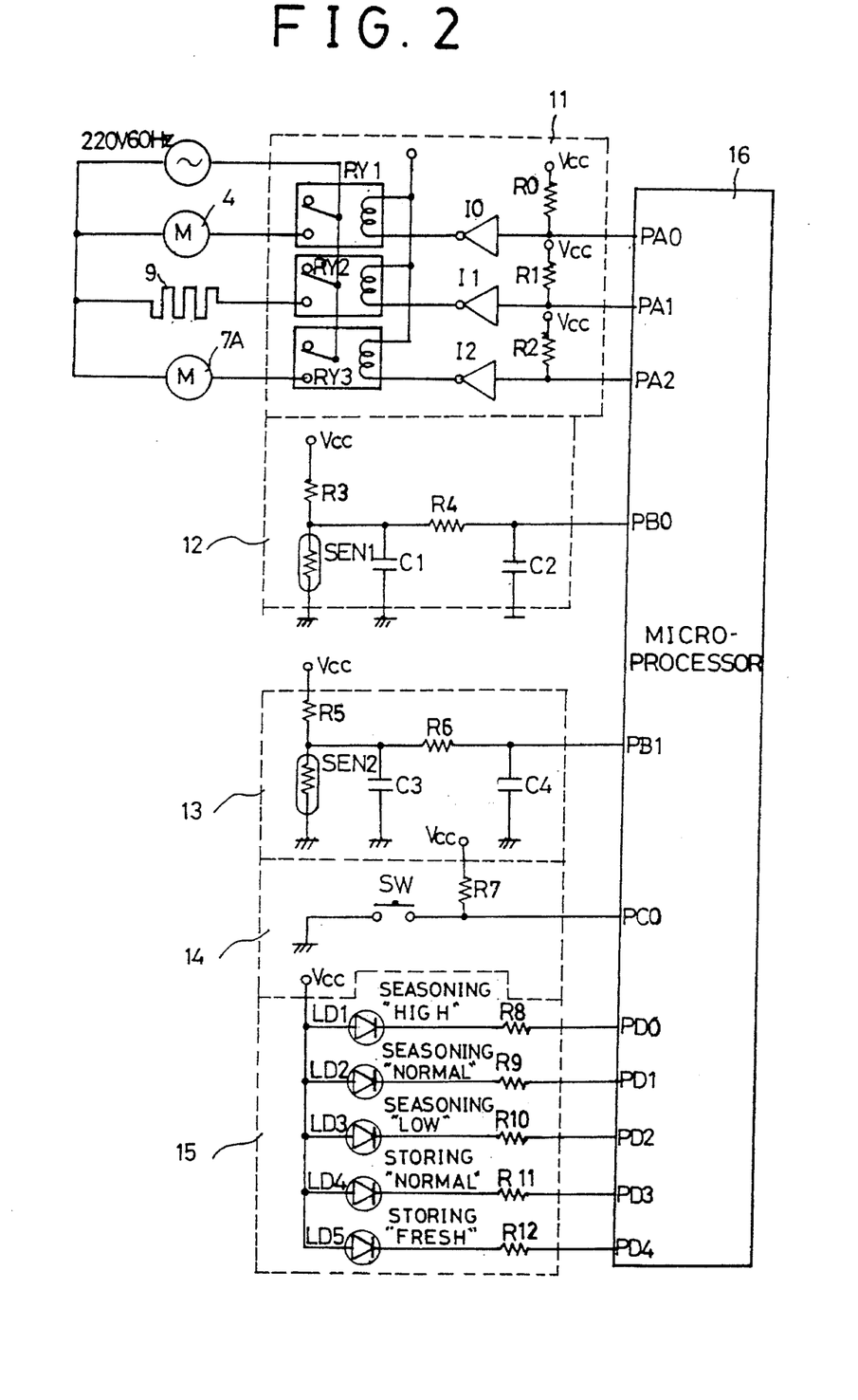
FIG. 2 is a circuit diagram of a control device of the refrigerator according to the first embodiment of the present invention.

FIG. 2 is a circuit diagram of a control device of the refrigerator according to the first embodiment of the present invention. The control device comprises a kimchi seasoning control circuit 11 constituted by a cooling fan driving relay RY1, a heater driving relay RY2, a damper motor driving relay RY3, inverters $I_0$ to $I_2$ and resistors $R_0$ to $R_2$. The kimchi seasoning control circuit 11 serves to control the operations of the damper motors 6A and 6B associated with the kimchi seasoning chamber 3A. The control device also comprises a kimchi seasoning chamber temperature sensing circuit 12 constituted by the sensor SEN1 for sensing the temperature of kimchi seasoning chamber 3A, resistors $R_3$ and $R_4$, and condensers, $C_1$ and $C_2$. The sensing circuit 12 serves to sense the temperature of kimchi seasoning chamber 3A. A heater temperature sensing circuit 13 is also provided, which is constituted by the sensor SEN2 for sensing the temperature of heater 9, resistors $R_5$ and $R_6$, and condensers $C_3$ and $C_4$. The sensing circuit 13 serves to sense the temperature of heater 9, for preventing the heater 9 from being overheated. The control device also comprises a selection switch circuit 14 provided with a kimchi seasoning/storing select switch SW and adapted to select a kimchi seasoning mode by a switching operation of the kimchi seasoning/storing select switch SW, and a display circuit 15 constituted by light emitting diodes $LED_1$ to $LED_5$ for displaying kimchi seasoning and storing modes and resistors $R_8$ to $R_{12}$. The display circuit 15 serves to display a desired kimchi seasoning degree, namely, a notch selected as one of "HIGH", "NORMAL" and "LOW" according to the user's notch selection and a selected one of the seasoning and storing modes. A microprocessor 16 is also provided, which is adapted to derive the difference between the temperature of kimchi seasoning chamber 3A sensed by the sensing circuit 12 and the temperature of heater 9 sensed by the sensing circuit 13, calculate the load of kimchi, based on the derived temperature difference, and control the kimchi seasoning control circuit 11 and the display circuit 15, based on the calculated kimchi load.

Figure 3:
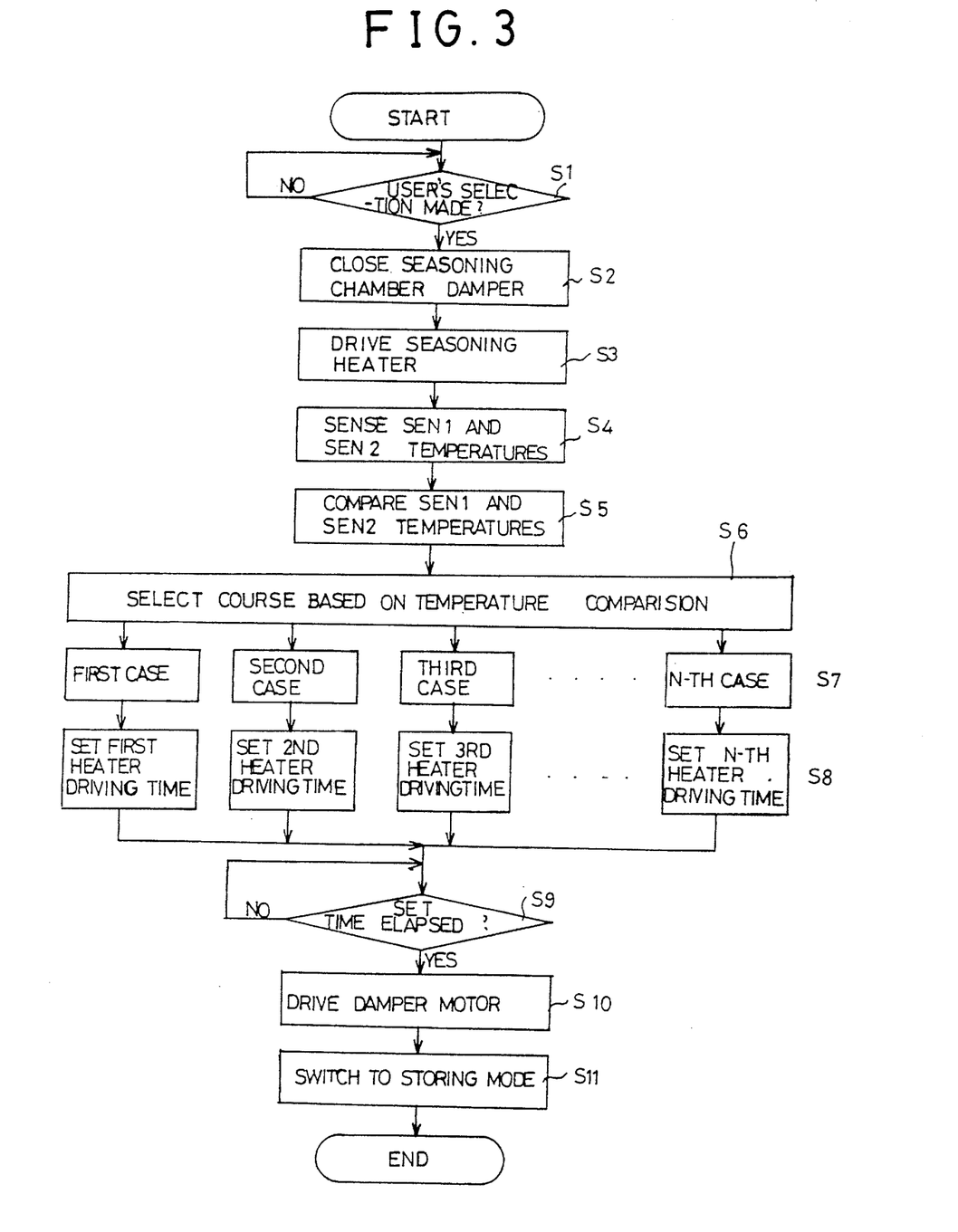
FIG. 3 is a flow chart illustrating a method of controlling the seasoning of kimchi by use of the control device according to the first embodiment of the present invention.

FIG. 3 is a flow chart illustrating a method of controlling the seasoning of kimchi by use of the control device according to the first embodiment of the present invention. As shown in FIG. 3, the method comprises a first procedure including three steps S1 to S3 of closing the damper 7 and driving the heater 9, for seasoning kimchi. Following the first procedure, a second procedure is executed, which includes two steps S4 and S5 of deducing the load of kimchi from signals output from the notch select switch SW and the sensors SEN1 and SEN2. The method also comprises a third procedure including two steps S6 and S7 of deriving a kimchi seasoning condition, based on the deduced kimchi load and a notch state selected by the user, a fourth procedure including two steps of S8 and S9 of driving the heater 9 for a kimchi seasoning time determined at the second procedure, for seasoning the kimchi, and a fifth procedure including two steps S10 and S11 of switching the operation mode to the kimchi storing mode after the lapse of the kimchi seasoning time.

Now, the kimchi seasoning control operation according to the above-mentioned method and apparatus according to the first embodiment of the present invention will be described, in conjunction with FIGS. 1 to 5.

First, prepared kimchi is contained in a kimchi container which is, in turn, placed in the kimchi seasoning chamber 3A. Thereafter, the notch select switch SW of display circuit 15 of FIG. 2 is switched on, so that the refrigerator operation mode is set to the seasoning mode. Thereafter, the user selects a desired seasoning degree by manipulating the notch select switch SW.

According to the mode selection, a low level signal is inputted at an input port PC0 of the microprocessor 16. When the notch "HIGH" is selected by the user, a low level signal is outputted from an output port PD0 of the microprocessor 16. When the notch "NORMAL" is selected, a low level signal is outputted from an output port PD1 of the microprocessor 16. When the notch "LOW" is selected, a low level signal is outputted from an output port PD2 of the microprocessor 16. The display circuit 15 receives these low level signals outputted from the microprocessor 16, so that its light emitting diodes $LD_1$ to $LD_3$ are turned on in the above-mentioned cases, respectively.

Also, the microprocessor 16 outputs a high level signal through its port PA2, so that the damper motor driving relay RY3 is activated, thereby causing the damper motor 7A to drive.

That is, the high level signal outputted from the microprocessor 18 is applied to the inverter $I_2$ of the kimchi seasoning control circuit 11 via the resistor $R_2$. Accordingly, the inverter $I_2$ outputs a low level signals by its signal inverting function. The low level signal from the inverter $I_2$ is then fed to the damper motor driving relay RY3, thereby causing the damper motor driving relay RY3 to be activated. By the activation of damper motor driving relay RY3, the damper 7 disposed at the rear portion of kimchi seasoning chamber 3A of FIG. 1 is closed.

As the damper 7 is closed, cold air fed by the cooling fan 4 of FIG. 1 is prevented from entering the kimchi seasoning chamber 3A.

The microprocessor 16 also outputs a high level signal through its port PA1, so that the heater driving relay RY2 is activated. By the activation of heater driving relay RY2, the heater 9 disposed at the bottom portion of kimchi seasoning chamber 3A generates heat.

Under the above-mentioned condition, the microprocessor 16 senses both the peripheral temperature of the heater inputted through its port PB1 and the internal temperature of kimchi seasoning chamber 3A inputted through its port PB0, so as to select a seasoning time.

Now, a procedure of selecting the seasoning time will be described, in conjunction with FIGS. 4 and 5.

Figure 4:
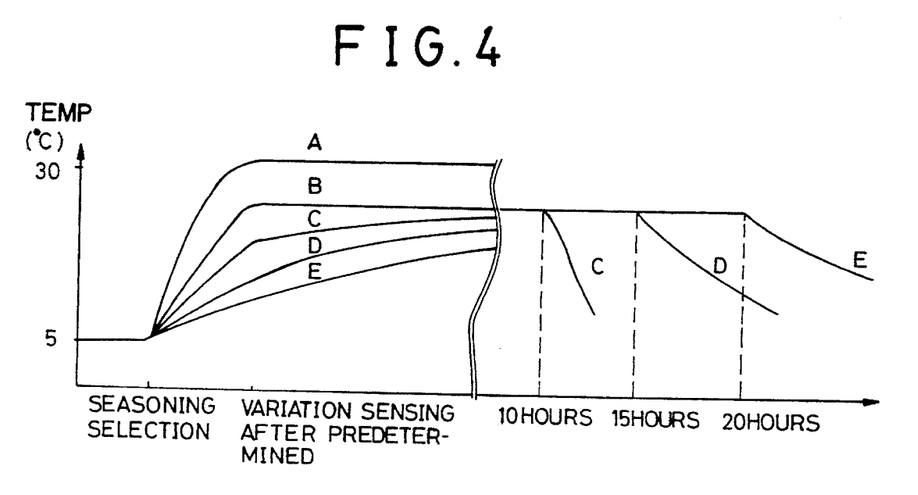
FIG. 4 is a graph illustrating a variation in kimchi seasoning chamber temperature depending on the load of kimchi.
Figure 5:
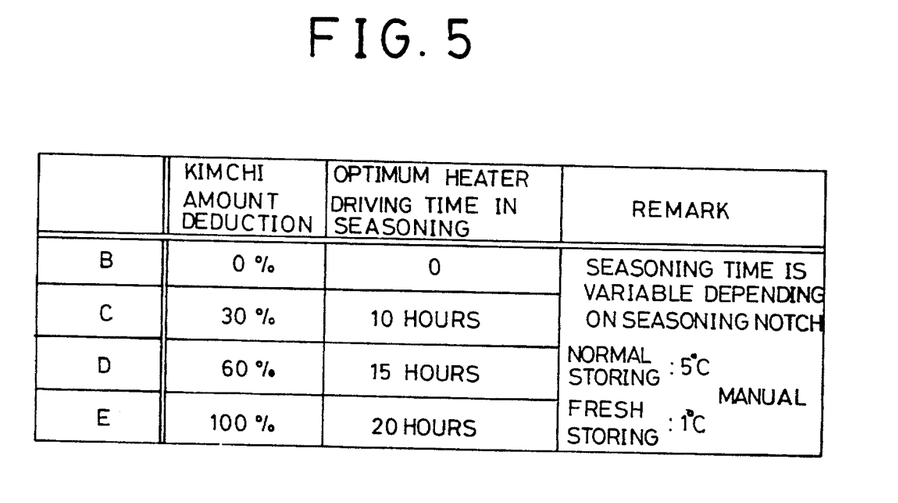
FIG. 5 is a table illustrating a kimchi seasoning time varied depending on the load of kimchi in accordance with the first embodiment of the present invention.

As the heater 9 generates heat, the peripheral temperature thereof is once increased and then kept constantly, as shown by a graph A of FIG. 4. The temperature of kimchi seasoning chamber 3A increased due to the heat generated from the heater 9 is varied, depending on the load of kimchi, as shown by graphs B to E of FIG. 4. The kimchi load is deduced to be higher when there is a larger difference between the kimchi seasoning chamber temperature and the heater temperature sensed at an optional point of time before the heater temperature reaches a predetermined temperature.

For instance, where the internal temperature of kimchi seasoning chamber 3A is sharply increased, as shown by the graph B of FIG. 4, a deduction is made that no kimchi is contained in the kimchi seasoning chamber 3A. In this case, a kimchi seasoning time of 0 is selected.

However, when the internal temperature of kimchi seasoning chamber 3A is increased, as shown by the graph C of FIG. 4, a deduction is made that kimchi is contained in the kimchi seasoning chamber 3A and fills 30% of the kimchi container. When the internal temperature of kimchi seasoning chamber 3A is increased, as shown by the graph D of FIG. 4, a deduction is made that kimchi is contained in the kimchi seasoning chamber 3A and fills 60% of the kimchi container.

On the other hand, when the internal temperature of kimchi seasoning chamber 3A is increased, as shown by the graph E of FIG. 4, the kimchi load is deduced to be 100%.

By the kimchi load deduced as above, the kimchi seasoning condition is determined. The determined kimchi seasoning condition may be corrected, according to the notch condition selected by the user.

First, from the deduced load of kimchi, a normal seasoning condition for the quantity of kimchi corresponding to the kimchi load is derived. The derived normal seasoning condition is then slightly corrected according to the user's notch selection.

For example, where the notch condition is "HIGH", a predetermined time is added to the derived normal seasoning time, so as to determine the sum resulting from the addition as the kimchi seasoning time. When the notch condition is "NORMAL" the derived normal seasoning time is determined as the kimchi seasoning time. On the other hand, where the notch condition is "LOW", the kimchi seasoning time is determined by deducting a predetermined time from the normal seasoning time.

Second, from the deduced quantity of kimchi and the selected notch condition, a corresponding kimchi seasoning condition is derived.

That is, assuming that the load of kimchi is detected by the unit of 10% and the notch condition involves three levels of "HIGH", "NORMAL" and "LOW", the seasoning condition for each case can be derived, as shown in the following table.

| Load of Kimchi | Notch Condition | Seasoning Condition |
| --- | --- | --- |
| . | . | . |
| . | . | . |
| . | . | . |
| 50% | High | 11 |
|  | Normal | 12 |
|  | Low | 13 |
| 60% | High | 14 |
|  | Normal | 15 |

-continued

| Load of Kimchi | Notch Condition | Seasoning Condition |
| --- | --- | --- |
|  | Low | 16 |
| . | . | . |
| . | . | . |
| . | . | . |

The deduction unit of the kimchi load and the number of notch condition levels may be adjusted as desired.

After the kimchi seasoning condition is derived in a manner as mentioned above, seasoning of kimchi is carried out by controlling the driving of the heater according to the derived kimchi seasoning condition.

After the lapse of the kimchi seasoning time determined according to the kimchi seasoning condition, the microprocessor 16 outputs low level signals through its ports PA1 and PA2, for activating the heater driving relay RY2 and the damper motor driving relay RY3.

By the activations of relays RY2 and RY3, the heater 9 stops the generation of heat and the damper motor 7A drives to open the damper 7. As the damper 7 is opened, cold air fed by the cooling fan 4 is introduced in the kimchi seasoning chamber 3A, so that the storing mode of the kimchi seasoning chamber 3A is carried out.

The kimchi seasoning chamber 3A is maintained at about 5° C. in a normal storing mode and about 1° C. in a fresh storing mode. The microprocessor 16 outputs a low level signal through its port PD3 in the normal storing mode and through its port PD4 in the fresh storing mode. The low level signal is applied to the display circuit 15, so that the light emitting diode $LD_4$ or $LD_5$ is turned on, thereby enabling the user to recognize the storing condition of kimchi.

As apparent from the above description, in accordance with the kimchi seasoning controlling method of the first embodiment, the load of kimchi is deduced by sensing the difference between the internal temperature of the kimchi seasoning chamber and the temperature of the kimchi seasoning heater. Based on the deduced kimchi load, seasoning of kimchi is carried out for a kimchi seasoning time corresponding to a selected notch condition. Accordingly, it is possible to provide kimchi meeting maximally the user's taste.

Figure 6:
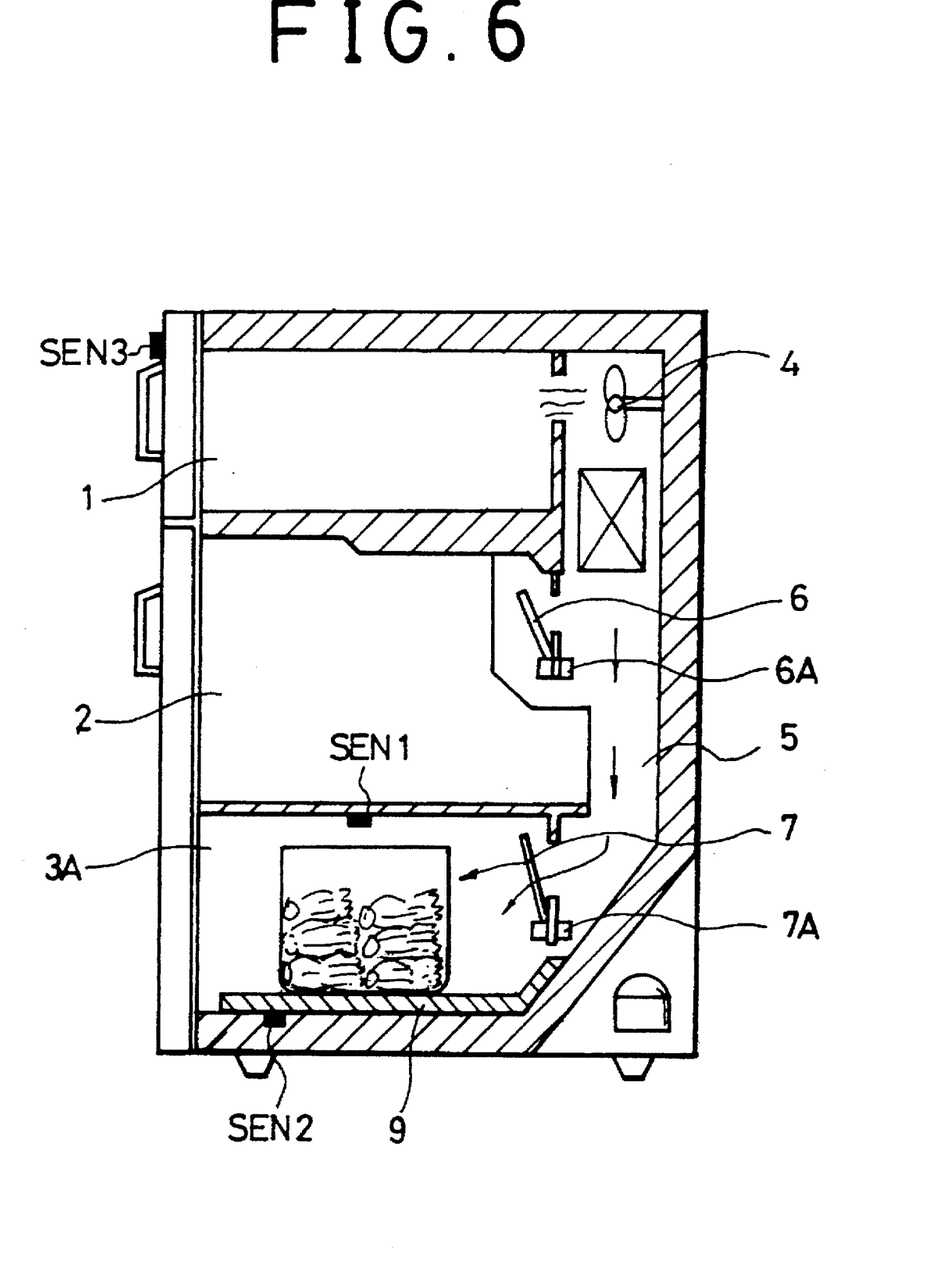
FIG. 6 is a schematic sectional view of a refrigerator in accordance with a second embodiment of the present invention.

Referring to FIG. 6, there is illustrated a refrigerator in accordance with a second embodiment of the present invention. In this embodiment, the refrigerator has the same construction as that of FIG. 1, except that a sensor SEN3 for sensing the ambient temperature outside of the refrigerator is outwardly disposed at the top portion of refrigerator body.

Figure 7:
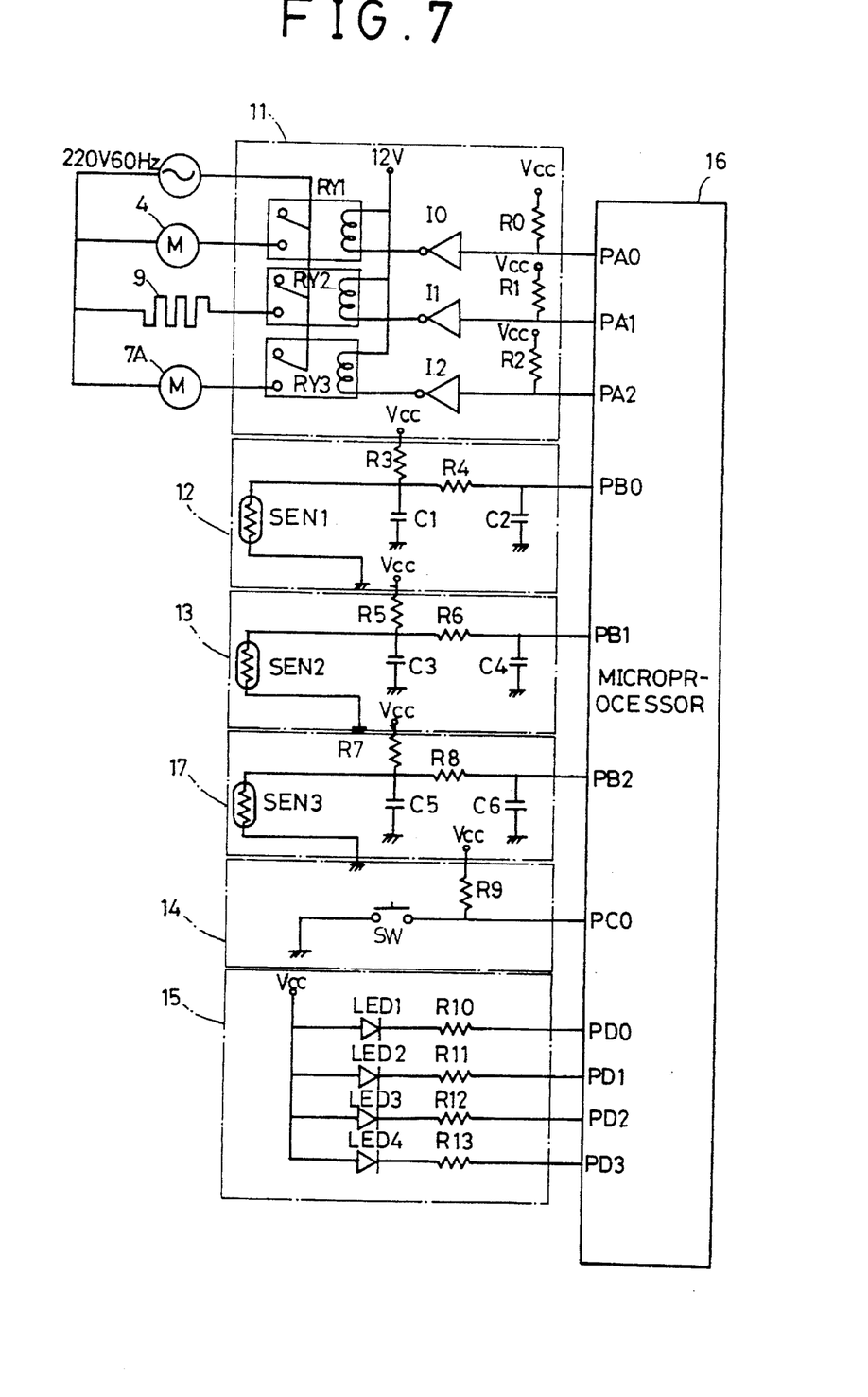
FIG. 7 is a circuit diagram of a control device of the refrigerator according to the second embodiment of the present invention.

FIG. 7 is a circuit diagram of a control device of the refrigerator according to the second embodiment of the present invention. The control device of FIG. 7 has the same construction as that of FIG. 2, except for the provision of an ambient temperature sensing circuit 17 which is constituted by the sensor SEN3 for sensing the ambient temperature, a resistor $R_8$ and condensers $C_5$ and $C_6$. In accordance with the second embodiment, the microprocessor 16 is controlled to provide different seasoning conditions of three levels according to the ambient temperature sensed by the ambient temperature sensing circuit 17, the initial temperature of kimchi upon pouring, the notch condition selected by the user and the heating degree of kimchi seasoning heater 9.

Figure 8A:
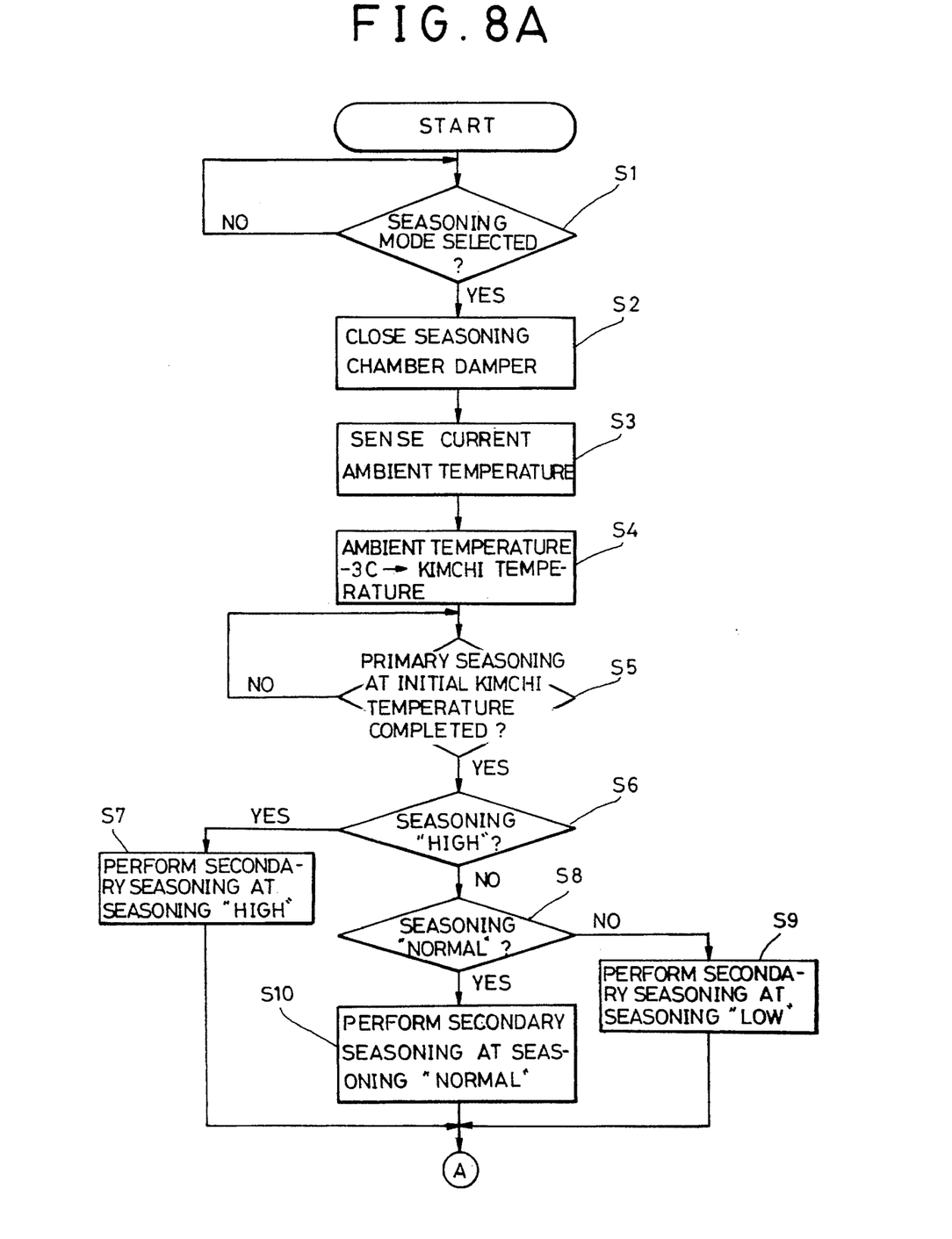
FIG. 8A and 8B are flow charts illustrating a method of controlling the seasoning of kimchi by use of the control device according to the second embodiment of the present invention.
Figure 8B:
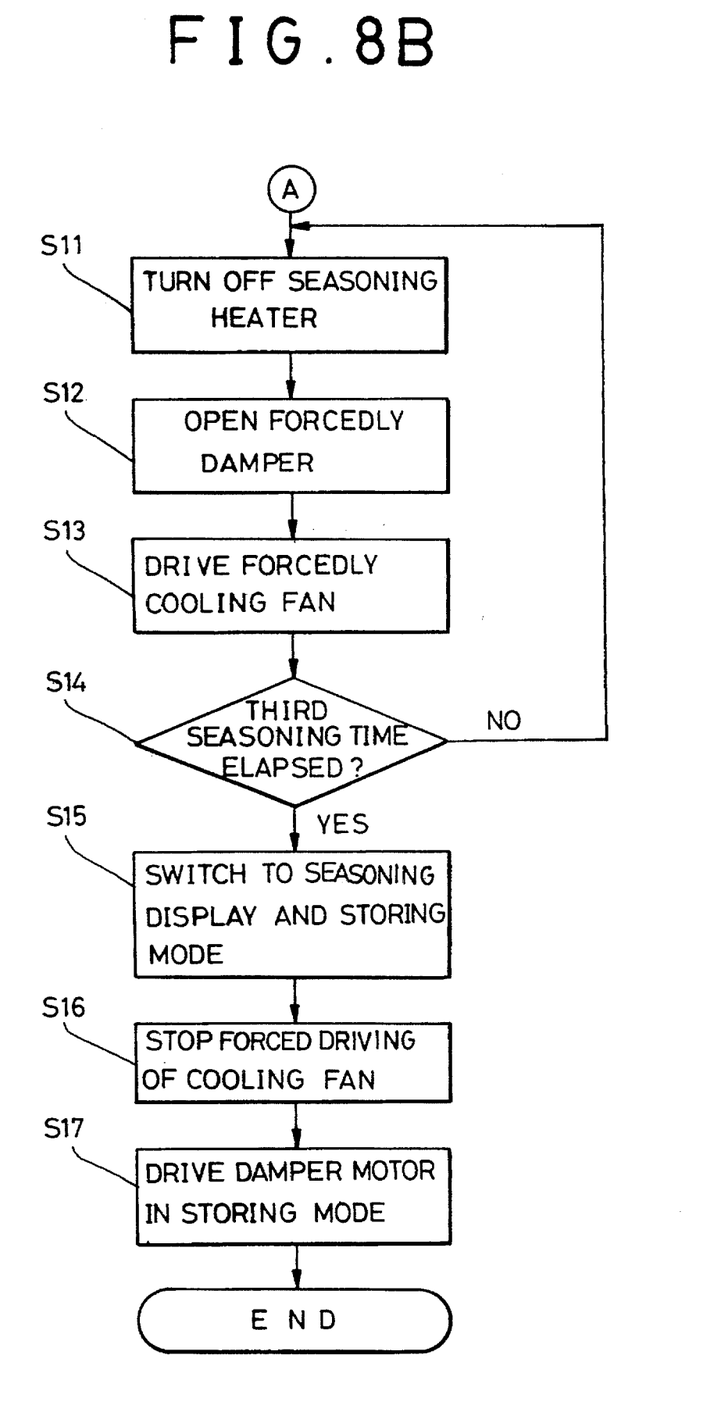

FIG. 8A and 8B are flow charts illustrating a method of controlling the seasoning of kimchi by use of the control device according to the second embodiment of the present invention. As shown in FIGS. 8A and 8B, the method comprises a first procedure including four steps S1 to S4 of sensing the ambient temperature outside the refrigerator when the kimchi seasoning mode is selected, deducting a predetermined temperature from the sensed ambient temperature, deducing an initial pouring temperature of kimchi, based on the result of the temperature deduction, and deducing a spontaneously seasoned degree of kimchi, based on the deduced initial pouring temperature of kimchi. Following the first procedure, a second procedure is executed, which includes a step. S5 of selecting an initial seasoning condition of kimchi, based on the deduced spontaneously seasoned degree and carrying out an initial seasoning of kimchi according to the selected initial seasoning condition, for seasoning the kimchi to a predetermined degree. The method also comprises a third procedure including five steps S6 to S10 of determining a main seasoning condition of kimchi according to a seasoning degree selected by the user and seasoning the kimchi according to the determined main seasoning condition, a fourth procedure including three steps of S11 to S13 of carrying out a finish seasoning of kimchi while decreasing sharply the temperature of the kimchi seasoning chamber to a predetermined temperature, and a fifth procedure including four steps S14 and S17 of informing the user of the completion of the seasoning of kimchi and maintaining the temperature of kimchi seasoning temperature at a predetermined storing temperature.

Now, the kimchi seasoning control operation according to the above-mentioned method and apparatus according to the second embodiment of the present invention will be described.

Kimchi is spontaneously seasoned during its preparation involving salting cabbage, rinsing the salted cabbage and dressing the rinsed cabbage with other condiment. The spontaneously seasoned degree of kimchi is variable, depending on the season, that is, the ambient temperature during the preparation of kimchi. Where the ambient temperature is high, the kimchi may be more or less seasoned before it is placed in the refrigerator.

As a result, the seasoned degree of kimchi when the kimchi prepared in the summer is artificially seasoned, is different from the seasoned degree of kimchi when the kimchi prepared in the winter is artificially seasoned, under the same seasoning condition.

In order to achieve the same seasoned degree of kimchi irrespective of the season during which kimchi is prepared, there is provided an initial seasoning condition which is variable depending on the spontaneously seasoned degree, of kimchi, for making the initially seasoned degree of kimchi constant. Thereafter, a seasoning of kimchi is carried out under a main seasoning condition.

For instance, when kimchi is prepared in the summer, seasoning of about 10% may be accomplished by the ambient temperature before kimchi can be placed in the refrigerator. When kimchi is prepared the winter, no initial seasoning of kimchi is accomplished before the storage of kimchi.

Accordingly, kimchi is initially seasoned under an initial seasoning condition determined according to the spontaneously seasoned degree of the kimchi, a certain seasoned degree for example, 30% of the total seasoning degree at the initial stake of the seasoning.

Thereafter, a main seasoning condition meeting the user's taste is determined. Under the determined main seasoning condition, the remaining part of the seasoning is carried out. Thus, the same seasoning result is obtained, irrespective of the season or the ambient temperature.

Now, the above procedures will be described in detail, in conjunction with FIGS. 6 to 11.

First, prepared kimchi is contained in a kimchi container which is, in turn, placed in the kimchi seasoning chamber 3A of FIG. 6. Thereafter, the notch select switch SW is switched on, so that the refrigerator operation mode is set to the seasoning mode. Thereafter, the user selects a desired seasoning degree by manipulating the notch select switch SW.

According to the mode selection, a low level signal is inputted at the port PC0 of the microprocessor 16 of FIG. 7. The microprocessor 16 is then controlled to season the kimchi, as follows.

The initial pouring temperature of kimchi is obtained by deducting a predetermined temperature from the ambient temperature sensed by the ambient temperature sensor SEN3 of FIG. 6.

Figure 9:
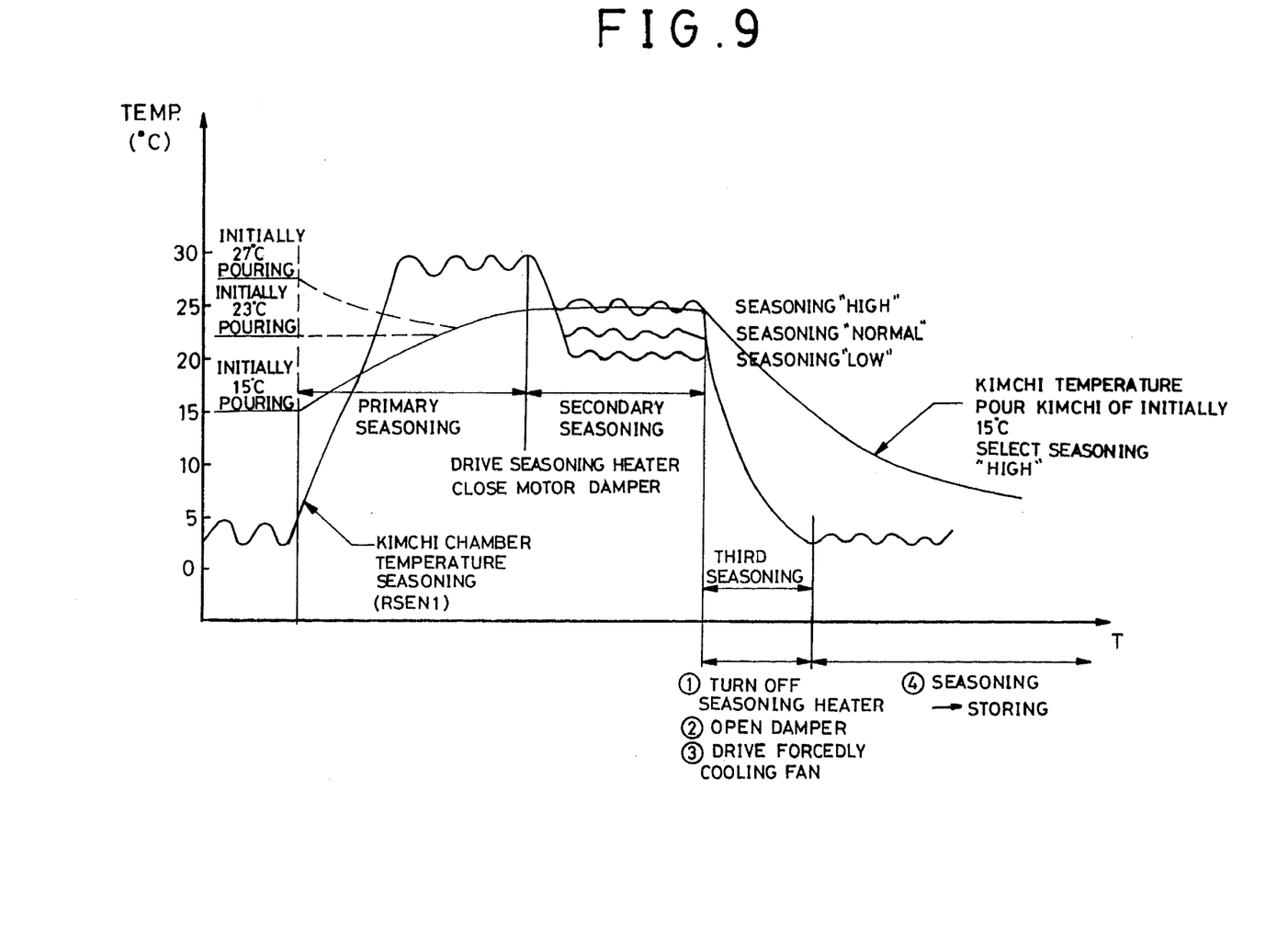
FIG. 9 is a graph illustrating the overall seasoning of kimchi according to the second embodiment of the present invention.
Figure 10:
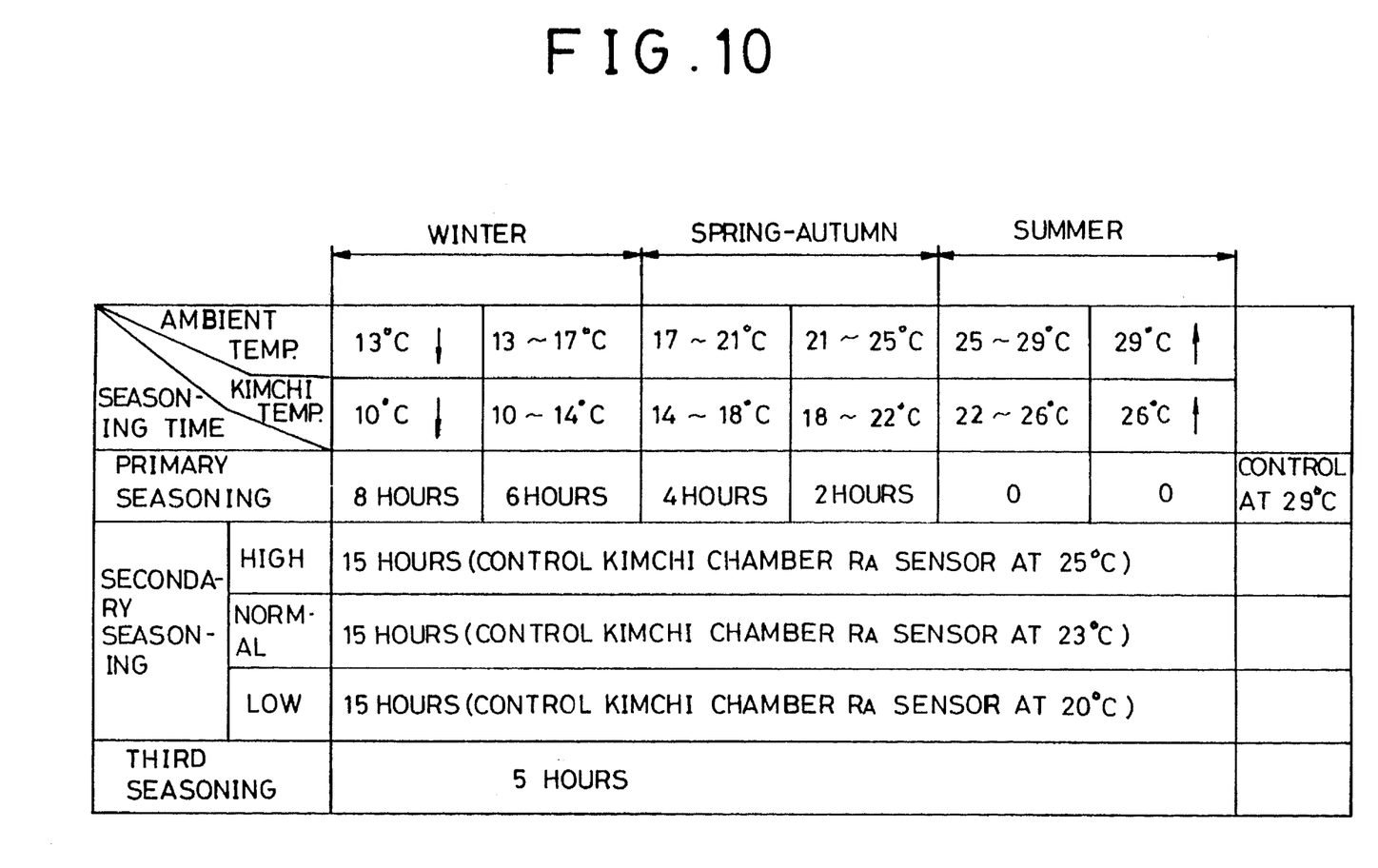
FIG. 10 is a table illustrating a seasoning temperature and a seasoning time varied depending on the season in accordance with the second embodiment of the present invention.

After the calculation of the initial pouring temperature of kimchi, the kimchi is initially seasoned at the initial pouring temperature for an initial seasoning time determined according to the initial pouring temperature as shown in FIGS. 9 and 10. Then, the kimchi is subjected to a main seasoning at a seasoning temperature selected according to the notch condition selected by the user. After the main seasoning, the kimchi is subjected to a finish seasoning while the temperature of kimchi seasoning chamber 3A is sharply decreased to a predetermined temperature of, for example, about 5° C.

After the finish seasoning of kimchi, the operation mode of kimchi seasoning chamber 3A is switched to the storing mode. At this time, the light emitting diode $LED_4$ of display circuit 15 is turned on, for displaying the storing mode.

The above procedures will be exemplarily described in detail, in conjunction with a case where the ambient temperature is 18° C., as in spring or autumn.

After prepared kimchi is placed in the kimchi seasoning chamber 3A, the notch select switch SW is switched on at the step S1 of the first procedure, so that the operation mode is set to the seasoning mode. Thereafter, the user sets the notch condition to the seasoning "NORMAL" by manipulating the notch select switch SW. At the steps S2 to S4 of the first procedure, the microprocessor 16 senses the ambient temperature of 18° C. through the ambient temperature sensor SEN3.

Also, the temperature value obtained by deducting 3° C. from the ambient temperature of 18° C. is set as the initial pouring temperature of kimchi.

Then, the step S5 of the second procedure is executed, for achieving the initial seasoning of kimchi. That is, the microprocessor 16 senses the internal temperature of kimchi seasoning chamber 3A through the sensor SEN1 and controls the driving of kimchi seasoning heater 9, so as to maintain the internal temperature of kimchi seasoning chamber 3A at 29° C. for 4 hours.

The steps S6 to S10 of the third procedure are then executed, for achieving the secondary seasoning of kimchi. This main seasoning is continued at 23° C. for 15 hours.

For achieving the finish seasoning of kimchi, the steps S11 to S13 of the fourth procedure are then executed. For the finish seasoning, the microprocessor 16 turns off the heater 9 and drives the damper motor 7A to open the damper 7. The microprocessor 16 also drives the cooling fan 4 so that the temperature of kimchi seasoning chamber 8A is sharply decreased to about 5° C. The finish seasoning is carried out during the sharp decrease of kimchi seasoning chamber temperature.

Finally, the steps S14 to S17 of the fifth procedure are executed, so that the light emitting diode $LED_4$ of display circuit 15 is turned on. By the light emitting diode $LED_4$, the user recognizes the completion of the seasoning procedures and the initiation of the storing mode operation.

Also, the above procedures will be exemplarily described in detail, in conjunction with a case where the ambient temperature is 30° C., as in summer.

After prepared kimchi is placed in the kimchi seasoning chamber 3A, the notch select switch SW is manipulated to set the notch condition to the seasoning "LOW". At the seasoning "LOW" condition, the initial pouring temperature of kimchi becomes 27° C. obtained by deducting from the ambient temperature of 30° C. Based on the initial pouring temperature, the seasoning procedures shown in FIGS. 9 and 10 are then carried out.

In this case, the initial seasoning procedure is not carried out, because it has already been completed in a spontaneous manner, due to the high ambient temperature. In the main seasoning procedure, the driving of kimchi seasoning heater 9 is controlled such that the inner temperature of kimchi seasoning chamber 3A is maintained at 20° C. for 15 hours. Thereafter, the third seasoning procedure is executed, for dropping the internal temperature of kimchi seasoning chamber 3A to 5° C.

As apparent from the above description, kimchi is primarily seasoned according to an initial seasoning condition determined depending on the ambient temperature, so that the seasoned degree of kimchi becomes constant. Then, the primarily seasoned kimchi is mainly seasoned according to a notch condition selected by the user. After the main seasoning, the kimchi is finish seasoned while the internal temperature of kimchi seasoning chamber is sharply dropped.

Since initial seasoning times and temperatures corresponding to various initial pouring temperatures of kimchi are stored in the form of a table, a proper initial seasoning condition is selected according to the inputted ambient temperature, by use of the table. After the primary seasoning under the selected initial seasoning condition, kimchi is mainly seasoned under a condition that a proper internal temperature of the kimchi seasoning chamber is selected according to a selected notch condition.

Where the peripheral temperature of the kimchi seasoning heater 9 exceeds a predetermined temperature, for example, about 60° C. due to an overheating of the heater 9, the heater temperature sensor SEN2 embedded in the bottom portion of kimchi seasoning chamber 3A senses it and serves to stop the driving of heater 9 Accordingly, it is possible to prevent fire.

As apparent from the above description, in accordance with the kimchi seasoning controlling method of the second embodiment, the spontaneously seasoned degree of kimchi is deduced by calculating an initial pouring temperature from an ambient temperature sensed. Based on the deduced spontaneously seasoned degree of kimchi, an initial seasoning condition is determined. As the kimchi is primarily seasoned under the determined initial seasoning condition, the seasoned degree of kimchi becomes constant irrespective of the season. The primarily seasoned kimchi is mainly seasoned according to a notch condition selected by the user and then finish seasoned while the internal temperature of the kimchi seasoning chamber is sharply dropped. Accordingly, it is possible to provide kimchi meeting maximally the user's taste.

Although the preferred embodiments of the invention have been disclosed for illustrative purposes, those skilled in the art will appreciate that various modifications, additions and substitutions are possible, without departing from the scope and spirit of the invention as disclosed in the accompanying claims. For example, the seasoning condition of kimchi meeting maximally the user's taste may be derived by use of both the load of kimchi deduced in accordance with the first embodiment and the initial pouring temperature of kimchi detected in accordance with the second embodiment.

What is claimed is:

1. A method of controlling seasoning of kimchi in a refrigerator equipped with a kimchi seasoning chamber having damper means for controlling flow of cold air into the kimchi seasoning chamber and a heater for heating the kimchi seasoning chamber, the method comprising the steps of:

controlling the damper means to prevent the flow of cold air into the kimchi seasoning chamber and activating the heater for a predetermined time to heat the kimchi seasoning chamber, when a kimchi seasoning mode is selected;

determining a load of kimchi to be seasoned, from a difference between a peripheral temperature of the heater and an internal temperature of the kimchi seasoning chamber after the seasoning chamber is heated;

determining a seasoning condition for the kimchi, based on the determined kimchi load; and seasoning the kimchi according to the determined seasoning condition.

2. A method of controlling seasoning of kimchi in a refrigerator equipped with a kimchi seasoning chamber having a heater for heating the kimchi seasoning chamber, the method comprising the steps of:

(a) activating the heater for a predetermined time to heat the kimchi seasoning chamber, when a kimchi seasoning mode is selected;

(b) determining a load of kimchi to be seasoned, from a difference between a peripheral temperature of the heater and an internal temperature of the kimchi seasoning chamber after executing the step (a);

(c) manually selecting a desired seasoning degree for the kimchi;

(d) determining a seasoning condition for the kimchi, based on the kimchi load determined at the step (b) and the desired seasoning degree selected at the step (c); and (e) seasoning the kimchi according to the seasoning condition determined at the step (d).

3. A method in accordance with claim 1, further comprising the steps of:

manually selecting a desired seasoning degree for the kimchi according to a user's taste; and correcting the seasoning condition, based on the desired seasoning degree.

4. A method in accordance with claim 1, wherein the seasoning condition is corrected when a desired seasoning degree for the kimchi is selected by a user.

5. A method in accordance with claim 2, wherein the determining step (d) includes the steps of:

storing various kimchi seasoning conditions previously set according to various kimchi loads and various desired seasoning degrees; and selecting one kimchi seasoning condition from the stored seasoning conditions, based on both the kimchi load determined at the step (b) and the desired seasoning degree selected at the step (c).

6. A method of controlling seasoning of kimchi in a refrigerator equipped with a kimchi seasoning chamber, the method comprising the steps of:

deducing a seasoned degree of kimchi when a kimchi seasoning mode is selected, the seasoned degree being indicative of a seasoning degree that the kimchi already has before the kimchi is placed in the kimchi seasoning chamber;

determining an initial seasoning condition, based on the deduced seasoned degree, and seasoning the kimchi contained in the kimchi seasoning chamber to a predetermined degree, according to the determined initial seasoning condition; and determining a main seasoning condition according to a user's taste and carrying out a main seasoning of the kimchi according to the determined main seasoning condition.

7. A method of controlling seasoning of kimchi in a refrigerator equipped with a kimchi seasoning chamber having a seasoning chamber heater, the method comprising the steps of:

deducing a seasoned degree of kimchi, which is to be seasoned in the seasoning chamber, when a kimchi seasoning mode is selected;

determining an initial seasoning condition, based on the deduced seasoned degree, and initially seasoning the kimchi contained in the kimchi seasoning chamber to a predetermined degree, according to the initial seasoning condition;

deducing a load of kimchi to be seasoned, from a difference between a peripheral temperature of the seasoning chamber heater and an internal temperature of the kimchi seasoning chamber when a predetermined time is elapsed after the initial seasoning;

determining a main seasoning condition, based on the deduced kimchi load; and seasoning the kimchi according to the determined main seasoning condition.

8. A method in accordance with claim 6, wherein the seasoned degree of kimchi is deduced from an ambient temperature sensed by a sensor outwardly disposed on the refrigerator.

9. A method in accordance with claim 6, wherein the initial seasoning condition is determined such that the kimchi is seasoned at a lower seasoning degree when the deduced seasoned degree is substantially high, and is seasoned at a higher seasoning degree when the deduced seasoned degree is substantially low.

10. A method in accordance with claim 6, further comprising the step of finish seasoning the kimchi while the internal temperature of the kimchi seasoning chamber is decreased to a predetermined temperature, after determining the main seasoning condition.

11. A method in accordance with claim 6, wherein the main seasoning is carried out under a condition that the internal temperature of the kimchi seasoning chamber is varied depending on the kimchi seasoning degree selected by the user.

12. A method in accordance with claim 1, further comprising the step of maintaining the seasoned kimchi at a predetermined storing temperature to carry out a kimchi storing mode.

13. A method in accordance with claim 2, further comprising the step of maintaining the seasoned kimchi at a predetermined storing temperature to carry out a kimchi storing mode.

14. A method in accordance with claim 6, further comprising the step of maintaining the seasoned kimchi at a predetermined storing temperature to carry out a kimchi storing mode.

15. A method in accordance with claim 7, further comprising the step of maintaining the seasoned kimchi at a predetermined storing temperature to carry out a kimchi storing mode.

* * * * *